(12) United States Patent
Karpanty

(10) Patent No.: US 9,173,386 B2
(45) Date of Patent: Nov. 3, 2015

(54) OUTRIGGER LINE LOCK POSITIONING DEVICE

(71) Applicant: Rupp Marine, Inc., Port Salerno, FL (US)

(72) Inventor: Ronald Karpanty, Port Salerno, FL (US)

(73) Assignee: Rupp Marine, Inc., Port Salerno, FL (US)

( * ) Notice: Subject to any disclaimer, the term of this patent is extended or adjusted under 35 U.S.C. 154(b) by 197 days.

(21) Appl. No.: 13/964,519

(22) Filed: Aug. 12, 2013

(65) Prior Publication Data

US 2014/0041282 A1    Feb. 13, 2014

Related U.S. Application Data

(60) Provisional application No. 61/682,540, filed on Aug. 13, 2012.

(51) Int. Cl.
  *A01K 91/06* (2006.01)
  *A01K 91/053* (2006.01)
  *A01K 91/08* (2006.01)

(52) U.S. Cl.
  CPC ............... *A01K 91/053* (2013.01); *A01K 91/08* (2013.01)

(58) Field of Classification Search
  CPC ..... A01K 91/06; A01K 91/08; A01K 91/053; B66D 3/10
  USPC .............. 43/27.4, 44.87, 27.2; 254/251, 252, 254/257, 391; 188/65.1; 114/199; 182/193
  See application file for complete search history.

(56) References Cited

U.S. PATENT DOCUMENTS

| | | | |
|---|---|---|---|
| 1,167,295 A * | 1/1916 | Hall | 24/134 KB |
| 4,097,023 A | 6/1978 | Muller | |
| 4,466,599 A * | 8/1984 | Singer | 254/391 |
| 4,580,658 A * | 4/1986 | Brda | 182/5 |
| 4,632,050 A | 12/1986 | Rupp | |
| 5,784,979 A * | 7/1998 | Nelson, III | 114/218 |
| 6,129,033 A | 10/2000 | Jarrell | |
| 6,974,125 B2 | 12/2005 | Renton | |
| 7,226,043 B2 * | 6/2007 | Stone et al. | 254/391 |
| 8,342,115 B2 | 1/2013 | Lindstrom | |

* cited by examiner

*Primary Examiner* — Peter M Poon
*Assistant Examiner* — Danielle Clerkley
(74) *Attorney, Agent, or Firm* — McHale & Slavin, P.A.

(57) ABSTRACT

Disclosed is a line positioning device for use with fishing vessel outriggers. The positioning device employs a housing having a pulley, a resilient bushing positioned next to the pulley, and a lever arm that is strategically positioned to engage a halyard line against the resilient bushing. A halyard line placed through the device is partially wrapped around the pulley where the line can freely move. Locking of the line requires the partial rotation of the lever arm which includes a tip end that presses the line against the resilient bushing. The lever arm includes a detent for engagement of a biased ball for use in holding the lever arm in either a locked or unlocked position.

21 Claims, 4 Drawing Sheets

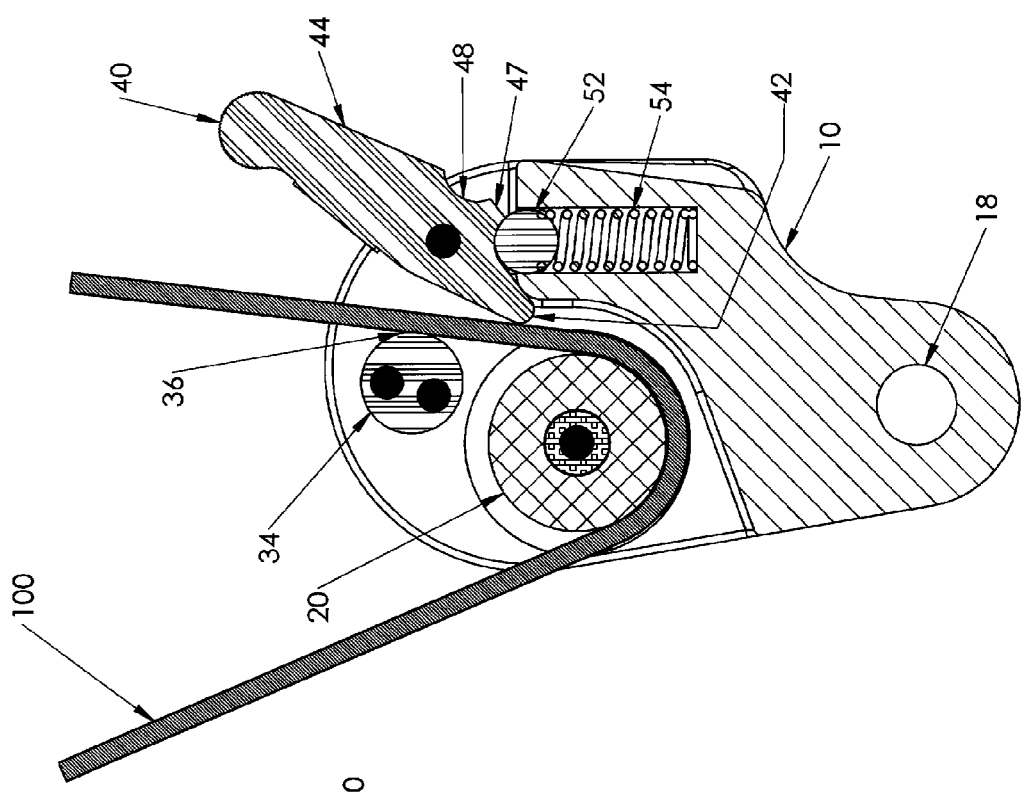
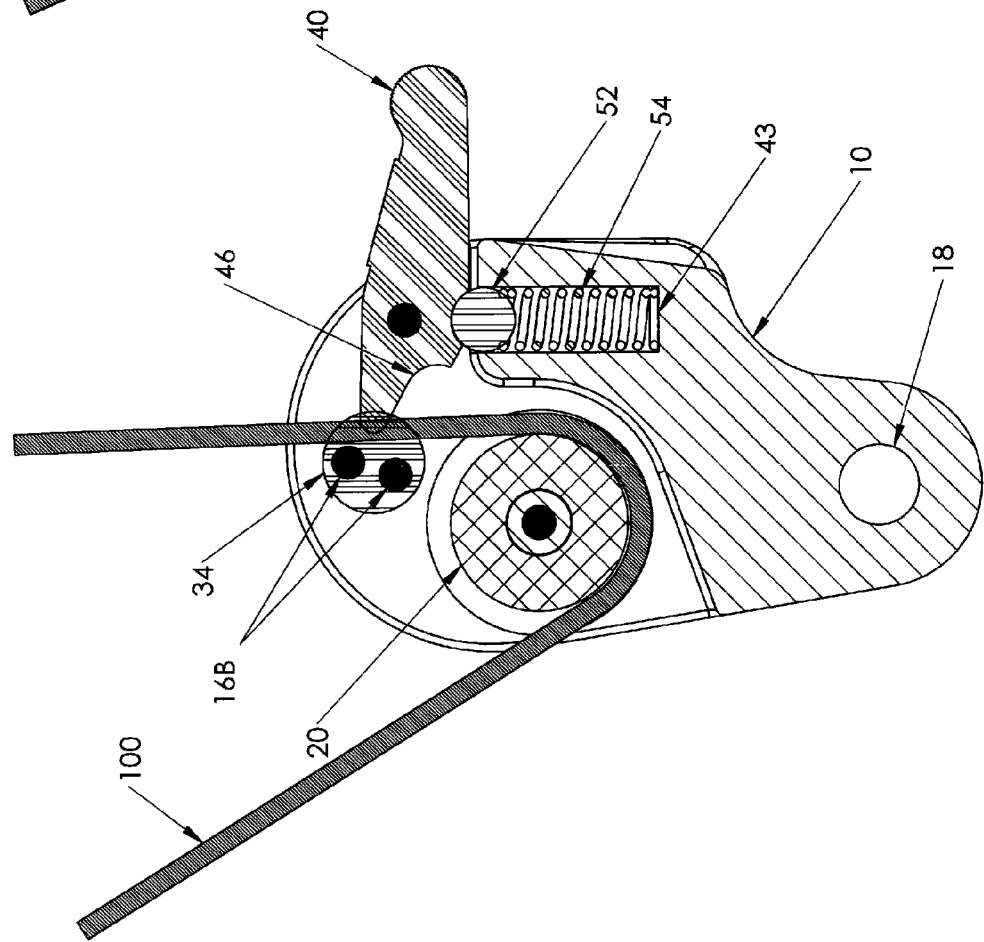

OUTRIGGER LINE LOCK POSITIONING DEVICE

PRIORITY CLAIM

In accordance with 37 C.F.R. 1.76, a claim of priority is included in an Application Data Sheet filed concurrently herewith. Accordingly, the present invention claims priority to U.S. Provisional Patent Application No. 61/682,540 entitled "OUTRIGGER LINE LOCK POSITIONING DEVICE" filed Aug. 13, 2012. The contents of which the above referenced application is incorporated herein by reference.

FIELD OF THE INVENTION

The invention relates to the field of fishing and more particularly to a line positioning device for use on fishing boats to lock an outrigger positioning line.

BACKGROUND OF THE INVENTION

Halyard lines are commonly known as the lines that are used to pull sails up a mast on a sailboat. At the end of a halyard line is a shackle that attaches to the sail. The line then runs to a pulley block at the masthead and comes back down alongside the mast. When the sail is up, the halyard is tied off tight to the mast cleat using a cleat hitch. Conventional halyards are made of high strength synthetic polymer fibers which lack memory but have the disadvantage of "creep," whereby the material elongates under constant load.

All known line locking devices, commonly referred to as "halyard locks" are used to address line creep issues. Traditionally a halyard lock includes a hook that latches to a ball-like fitting on the halyard. The lock operates like a door latch when the tension is relieved on the lock the latch will open to release the line. Earlier halyard locks used a trip line that attached to the latch and was tensioned for releasing the line.

The principal of the Halyard style locks were adapted for use on outriggers commonly used on fishing vessels. Outriggers are defined as a pair of fiberglass, carbon fiber, or aluminum poles secured to the sides of a vessel for use in positioning fishing lines away from the vessel. Outriggers allow the fisherman to make a presentation in the water that would not otherwise be possible due to the width of the boat. For instance, a 30-foot boat, without outriggers, may have a 10 foot beam wherein fishing lines can only maintain a separate which equals the width of the boat. Placement of 15-foot outriggers on the same boat permits the placement of fishing lines at a distance of nearly 40 feet. On larger vessels the outriggers may be 40-feet and the width of the boat 20 feet wherein outboard fishing lines might be positioned 100 feet apart. By placement of fishing lines outside the width of the vessel, a greater "spread" of fishing lines and bait/lures are presented. The result is a greater opportunity to catch fish.

Outriggers are commonly formed of a tubular mast of modest diameter which is strengthened against bending or buckling by longitudinal cable truss systems that include spreader arms to stand off the cable from the mast to create a truss unit, as disclosed in Applicant's U.S. Pat. No. 4,632,050. Fishing with outriggers is performed when a fishing vessel is driven slowly, commonly referred to as trolling, which permits the strategic placement of bait behind the vessel. Each outrigger includes at least one pulley with a line, commonly referred to as the halyard line. To strategically place bait, a quick release clip is attached to the outrigger halyard line to hold the fishing line dragging bait. An outrigger halyard line can hold multiple fishing lines in this manner, spaced at intervals outwards from the boat.

The wake generated by the vessel can appear to predator fish like a school of fish. Bait which appears to be struggling or separated from the school, or wake, are the most attractive to predator fish. If the bait is properly placed, the bait dragging on the fishing line will appear as struggling or separated fish. Once a fish strikes, the line is released so that it can be landed with the use of the traditional rod and reel. However, while dragging bait, the fishing line can pull on the outrigger's halyard line causing the previously mentioned line creep which decreases the chance of catching a fish. Line creep on the outrigger halyard line causes the release clips to move back towards the boat, which decreases the fishing territory and can result in tangled lines. The halyard line is used to position the release clip, and thus the fishing line, outboard of the vessel.

Braided nylon is the most popular line material for outriggers. The line has no memory and is easy to deal with when the poles are retracted or removed from the bases. Monofilament may also be used and works well with fixed-length poles that remain on the boat. Trolling with fishing lines attached to outriggers can strain the halyard line wherein the line can easily creep as the release clip attachment is known to work its way back to the vessel while fishing. The most common fix to stop line creep is by use of a halyard style line lock.

U.S. Pat. No. 8,342,115 to Lindstrom discloses a device at a cleat for a vessels in order to provide detachable locking of the line to a sail, a rig or the like, where the line runs over a sheave on an elevated level and having a cleat for locking the line situated at a distance from the deck of the boat. In the device, the line runs over a sheave, which is provided with ratchet back stop, and is arranged to co-operate with a movably actuatable mechanism, which activates the ratchet back stop.

U.S. Pat. No. 6,974,125 to Renton discloses a line-handling block for vessels having an attachment device rotatably mounted in the body. A locking device is slidably connected in keyhole slots and can slide into or out of engagement with the attachment device. When the locking device is engaged, only limited rotation of the attachment device to either side of a central position may be permitted.

U.S. Pat. No. 6,129,033 to Jarrell discloses a pulley or roller-type block with a locking arrangement. The locking arrangement can form a permanent weak spot in the line due to a highly concentrated clamping contact. At least a portion of a rolling unit is formed of resilient material, whereby the clamping contact on the line, as squeezed between the rolling unit and the clamping mechanism, is distributed by flexion of the roller unit resilient material.

U.S. Pat. No. 4,097,023 to Muller discloses a pulley over which a rope moves with an eccentric cam which is pivotable to selectively clamp or release the rope against the pulley and a pivotable lever to which the cam is connected such that motion of the lever pivots the cam between its clamping and releasing position.

Accordingly, what is disclosed is a line positioning device that is used to prevent line creep in an outrigger fishing assembly. The line positioning device of the present invention overcomes the problems of the prior art by providing a simple locking pulley device which holds the line against a resilient bushing in a secure locked position. The locking lever can also provide quick visual confirmation of whether the device is in a locked position.

SUMMARY OF THE INVENTION

The instant invention is an outrigger line positioning device with assimilates a halyard locking principle. The positioning device employs a housing having an internal chamber for placement of a pulley, resilient bushing, and lever arm. The device allows ease of passage of a line under normal conditions, and when the line is desired to be tensioned so as to be placed in a non-movement position, the lever arm is rotated so as to pinch the tip end against a uniquely fastened resilient bushing that provides improved frictional engagement. The lever arm includes a ball actuated detent for engagement of a biased ball for use in holding the lever arm in either a locked or unlocked position.

An objective of the invention is to provide a line positioning device having a mechanically operated lever arm to engage an outrigger positioning line.

Yet another objective of the invention is to provide a line positioning device that is inexpensive to manufacture and constructed to permit the mounting of internal components by use of externally inserted driv-lok pins.

Another objective of the invention is to disclose a use of a spring biased ball detent in combination with the lever arm to provide a tactile feel when positioning a halyard type line in a locked or unlocked position.

Still another objective of the invention is to disclose the use of a one piece housing that can be manufactured from plastic, aluminum or stainless steel.

Yet still another objective of the invention is to provide lever arm indicia to provide a lever that provide visual indication as to the status of the locking device.

Other objectives and advantages of this invention will become apparent from the following description taken in conjunction with the accompanying drawings wherein set forth, by way of illustration and example, certain embodiments of this invention. The drawings constitute a part of this specification and include exemplary embodiments of the present invention and illustrate various objectives and features thereof.

BRIEF DESCRIPTION OF THE DRAWINGS

FIG. 2 is a cross sectional side view of the line positioning device in a locked position;

FIG. 3 is a cross sectional view of the line positioning device in an unlocked position;

DETAILED DESCRIPTION OF THE PREFERRED EMBODIMENT

Figure 1:
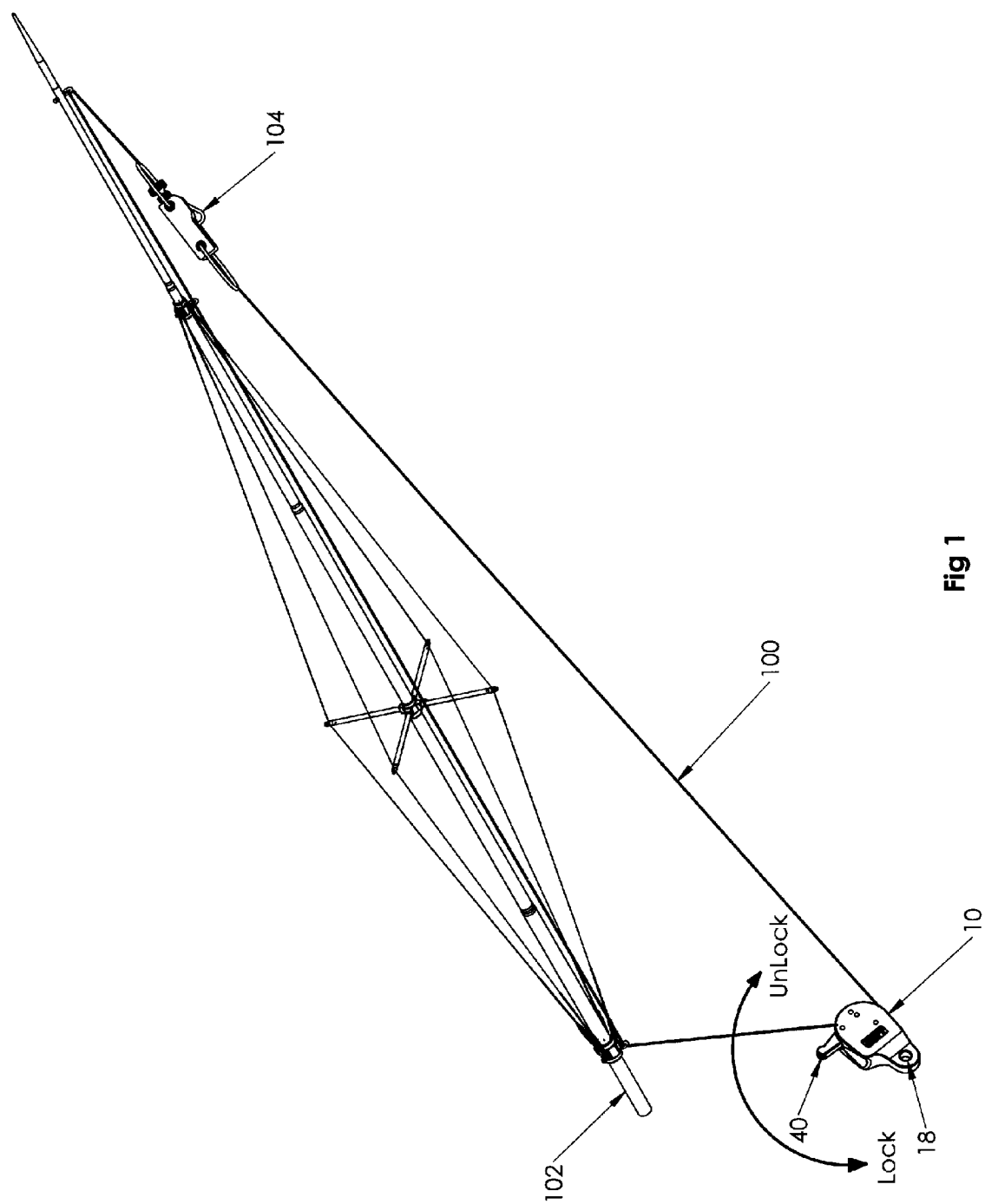
FIG. 1 depiction of the interaction of the line positioning device with an outrigger.
Figure 4:
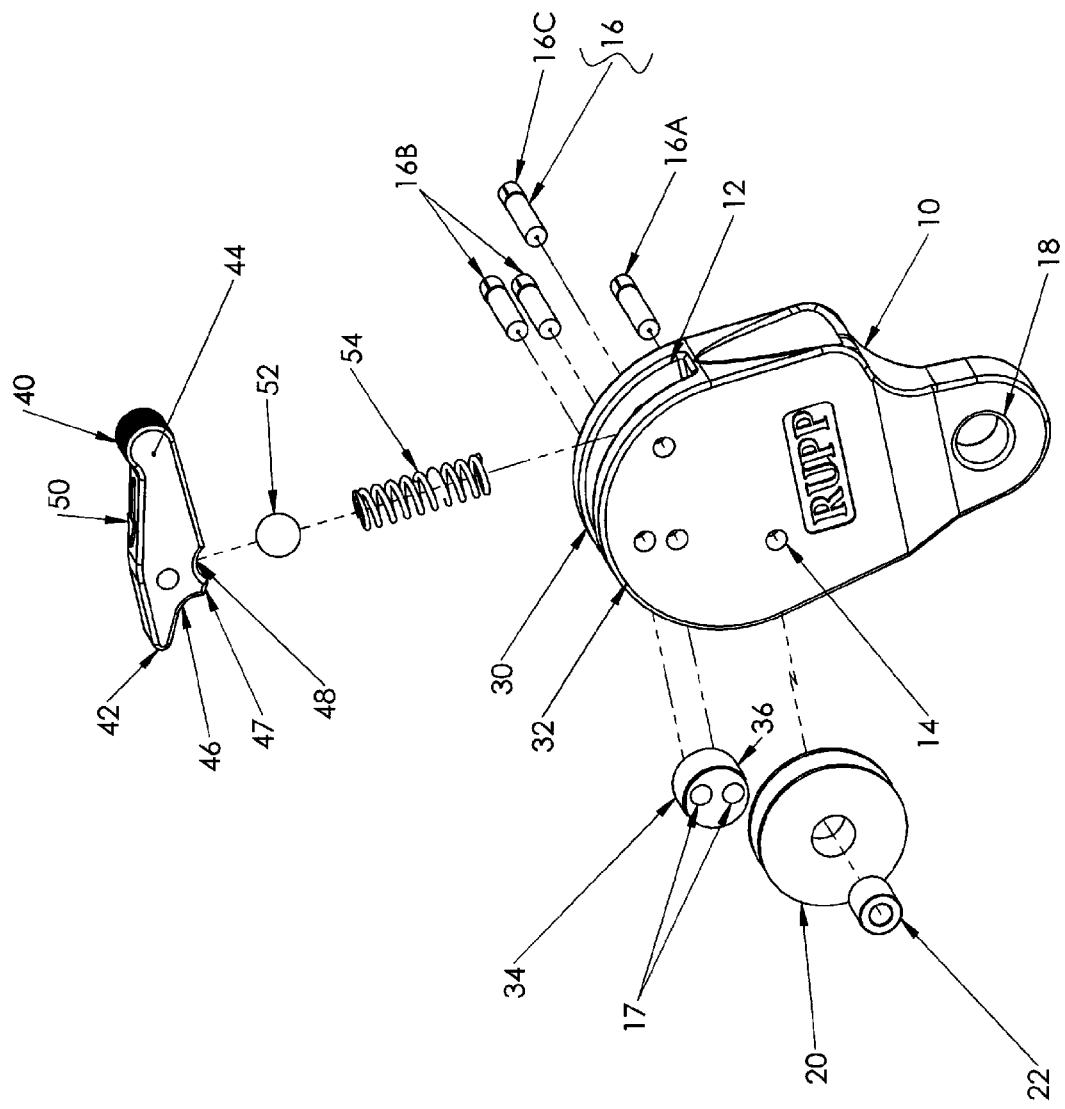
FIG. 4 is an exploded view of the line positioning device.

Referring now to the figures, set forth is the outrigger line positioning device of the instant invention. The positioning device is defined as a housing 10 having an inner chamber 12 with a series of through holes 14 constructed and arranged to receive driv-lok pins 16 for the mounting of various internal components. Driv-lok pins 16 bridge the inner chamber 12 to allow for an equal loading on the components due to fishing line drag. The housing 10 can be formed from a single piece of injection molded plastic as the use of driv-lok pins 16 lessen the need for a reinforced wall member. However, it is preferred that the housing 10 is formed from aluminum or stainless steel due to the superior life of the materials when exposed to sunlight for years. The use of the externally positioned driv-lok pins 16 again allow for a single piece housing 10 as the components are positioned within the inner chamber 12 but secured by driv-lok pins 16 attached from outside the inner chamber 12. The housing 10 includes a mounting aperture 18 to permit ease of securement to a vessel typically by use of a flexible cord 112.

A pulley 20 component is mounted within the inner chamber 12. The pulley 20 includes a centrally disposed bearing 22 for ease of rotation. Driv-lok pin 16a is placed through a first side wall 30 of the inner chamber 12 extending to a second side wall 32 of the inner chamber 12 providing the previously mentioned uniform support. For instance, should a line be placed through the wheel of the pulley 20 and drawn taught, having a driv-lok pin 16a that extends across the inner chamber 12 will maintain the pulley in-line with the halyard line 100 to prevent off center halyard line 100 loading. The pulley 20 is constructed and arranged to receive the halyard line 100 around a portion of the pulley 20 to allow attachment of the device in any convenient position.

Bushing 34 is positioned next to the pulley 20 at a distance sufficient to allow clearance of the halyard line 100 during rotation, yet close enough so that the housing 10 can be kept to a minimum size. The bushing 34 is formed of a resilient material such as rubber and employs two driv-lok pins 16b which are offset from a center line of the bushing 34 depicted by mounting holes 17. The offset is important so as to provide a leading side edge 36 of the bushing 34 that has a predefined deformation that allows the halyard line 100 to be pinched, without marring, during a locked condition. The offset further prevents rotation of the bushing 34. A lever arm 40 is pivotably attached to the housing 10 by use of driv-lok pin 16c. The lever arm 40 includes a tip end 42 and a shank 44.

A first detent 46 on the lever arm 40 is constructed and arranged to receive a biased ball 52 for maintaining the lever arm 40 in an open position, as shown in FIG. 3. The open position allows ease of halyard line 100 movement. The second detent 48 on the lever arm 40 operates in combination with the biased ball 52 for positioning the lever arm 40 in a fixed closed position, as illustrated in FIG. 2, to prohibit halyard line 100 movement. The lever arm 40 may include indicia 50 placed along a side surface so as to provide a visual representation of the lever arm 40 for operational purposes. The lever arm 40 is maintained in either an open or closed position by use of the biased ball 52. The ball 52 is biased by spring member 54 positioned within spring chamber 43, the spring chamber 43 maintains the spring member 54 in a proper position.

In operation, the biased ball 52 is securely maintained in the first detent 46 which prohibits movement of the lever arm 40 from the open position and prevents the halyard line 100 from accidently engaging the lever arm 40. The lever arm 40 is rotated in an outward position wherein the biased ball 52 is moved from within the first detent 46 to the second detent 48 and the shank 44 of the lever arm 40 extends outward from an edge of the housing 10 providing a visual indication that the halyard line 100 is crimped. Movement of the lever arm 40 into a closed position requires rotation of the lever arm 40 across a flat surface 47 to second detent 48. The flat surface 47 allows for a positive tactile feel between the first detent 46 and the second detent 48 so an operator can positively confirm through sound or touch that the lever arm 40 has been moved from one position to another.

In the closed position the tip end 42 of the lever arm will frictionally engage the halyard line 100 forcing the halyard line 100 against the resilient bushing 34 to securely hold the halyard line 100 in a fixed or locked position. In this position, the shank 44 of the lever arm 40 is in a substantially perpendicular position to the halyard line 100 providing a visual indication of a locked position. The bushing is made of a material that is temporarily deformable in combination with the placement of the driv-lok pins 16b so as to pinch the halyard line 100 between the tip end 42 of the lever arm 40 and the leading side surface 36 of the resilient bushing 34 without marring the halyard line 100. The material of the bushing 34 is preferably rubber having no memory characteristics.

The device can return to an open position by rotating lever arm 40 causing the biased ball 52 to move from the second detent 48 back to the first detent 46. As the biased ball 52 moves it compress spring member 54 into the spring chamber 43 so that it can pass over the flat surface 47. In the open position, the halyard line 100 can be moved to bring the line clip 104 along the outrigger 102 either towards the boat or into a position to troll for fish.

Figure 5:
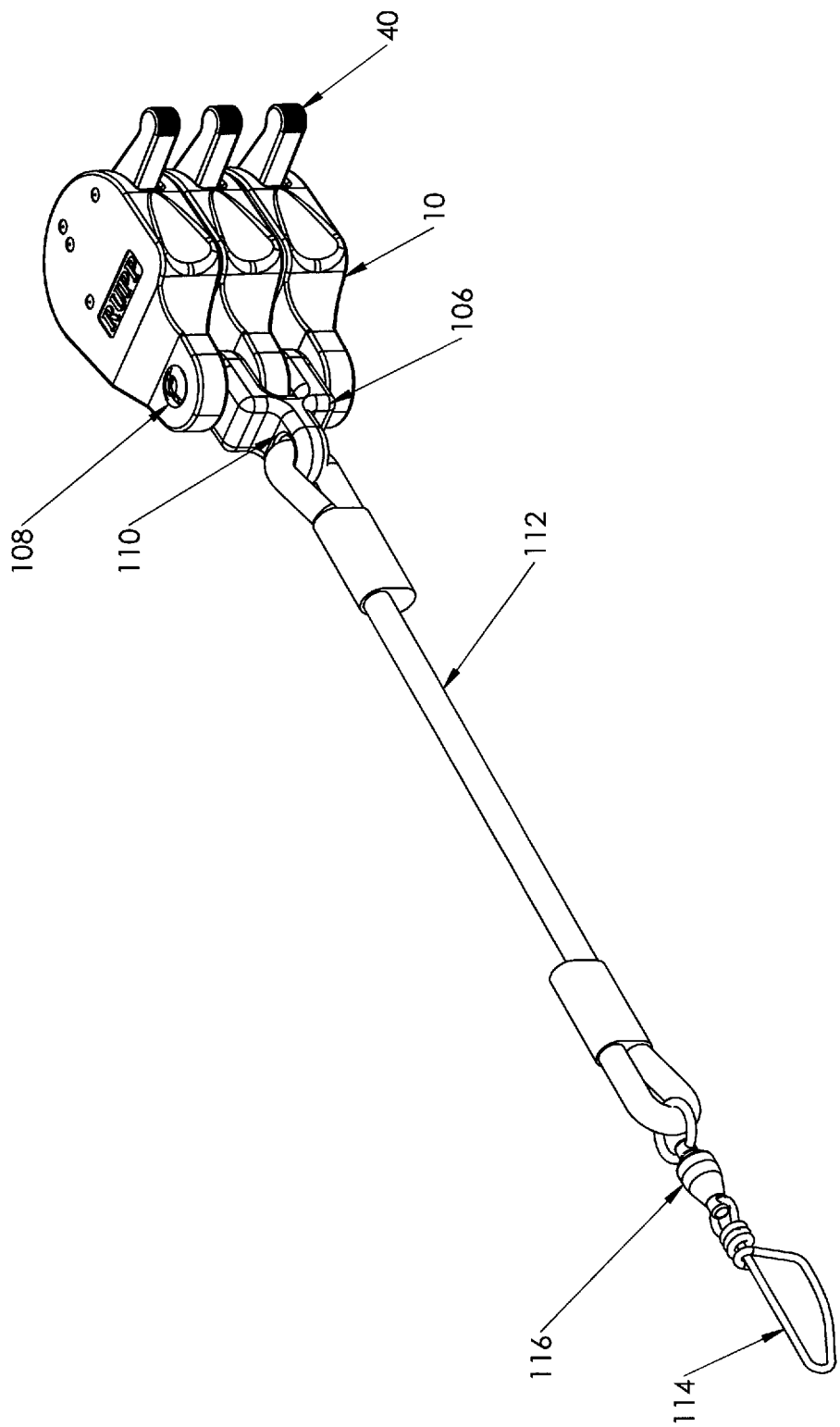
FIG. 5 is a perspective view of multiple line positioning devices coupled together.

As illustrated in FIG. 5, multiple outrigger line positioning devices can be connected in series by using a coupler 106. FIG. 5 shows three devices connected using a coupler 106 and coupler bolt 108, however the same concept can be applied to attach any number of line positioning devices together. The coupler bolt 108 passes through the mounting aperture 18 of the housing 10 of each device. When multiple line positioning devices are connected the mounting aperture 18 is no longer available to connect to a flexible cord 112 and so the coupler aperture 110 allows the group of housings to be connected to a stable object on the boat. The attachment depicted is a clip wire 114 secured to the flexible cord 112 by a swivel 116.

One skilled in the art will readily appreciate that the present invention is well adapted to carry out the objectives and obtain the ends and advantages mentioned, as well as those inherent therein. The embodiments described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A line positioning device comprising:
    a housing having an inner chamber formed from two side walls;
    a pulley rotatably mounted to, and positioned between, said side walls within said inner chamber, said pulley constructed and arranged for centrally positioning a flexible line;
    a stationary bushing juxtapositioned to said pulley and mounted between said side walls within said inner chamber; and
    a lever arm having a tip end and an elongated shank, said lever arm includes a first detent and a second detent, said housing further includes a spring biased detent ball selectively received within the first detent and the second detent for maintaining said arm in an open or closed position,
    said lever arm being pivoted within said chamber wherein placement of said tip end between said pulley and said bushing permits movement of said flexible line and placement of said tip end to engage said flexible line against said stationary bushing maintains said flexible line in a fixed position.

2. The line positioning device according to claim 1 wherein said bushing is formed from a resilient material.

3. The line positioning device according to claim 2 wherein said resilient material is rubber.

4. The line positioning device according to claim 2 wherein said bushing is mounted to said inner chamber by two offset positioned drive-lok pins; wherein said bushing has a greater degree of deformity on one side edge.

5. The line positioning device according to claim 1 wherein said pulley includes a bearing to allow for ease of pulley rotation.

6. The line positioning device according to claim 1 wherein said lever arm includes the first detent for use in maintaining said lever arm in an open position allowing movement of said flexible line.

7. The line positioning device according to claim 6 wherein said lever arm includes the first detent for use in maintaining said lever arm in a closed position to secure said flexible line against said stationary bushing to maintain said flexible line in a fixed position.

8. An outrigger halyard line positioning device comprising:
    a housing having a mounting aperture and an inner chamber;
    a pulley rotatably mounted within said inner chamber, said pulley constructed and arranged for positioning of a flexible line;
    a bushing juxtapositioned to said pulley and within said inner chamber; and
    a lever arm rotatably mounted within said inner chamber having a tip end and an elongated shank, said lever arm includes a first detent and a second detent, said housing further includes a spring biased detent ball selectively received within the first detent and the second detent for maintaining said arm in an open or closed position,
    said lever arm being pivoted within said chamber wherein placement of said tip end between said pulley and said bushing permits movement of said flexible line and placement of said tip end to engage said flexible line against said bushing maintains said flexible line in a fixed position.

9. The outrigger halyard line positioning device according to claim 8 wherein said bushing is constructed of a resilient material.

10. The outrigger halyard line positioning device according to claim 9 wherein said resilient material is rubber coated.

11. The outrigger halyard line positioning device according to claim 9 wherein said bushing is mounted within said inner chamber by two offset positioned drive-lok pins; wherein said bushing has a greater degree of deformity on one side edge.

12. The outrigger halyard line positioning device according to claim 8 wherein said lever arm includes the first detent for use in maintaining said lever arm in an open position allowing movement of said flexible line.

13. The outrigger halyard line positioning device according to claim 12 wherein said lever arm includes the first detent for use in maintaining said lever arm in a closed position to secure said flexible line against said stationary bushing to maintain said flexible line in a fixed position.

14. The outrigger halyard line positioning device according to claim 8 wherein said mounting aperture is sized for receipt of said flexible line that is securable to a fixed object.

15. The outrigger halyard line positioning device according to claim 8 wherein said shank extends outwardly from a side edge of said housing providing a visual indication whether said flexible line is secured.

16. The outrigger halyard line positioning device according to claim 15 wherein said shank includes directional indicia to provide a visual indication of line securement.

17. The outrigger halyard line positioning device according to claim 8 wherein said pulley is mounted to said housing by use of a driv-lok pin.

18. The outrigger halyard line positioning device according to claim 8 wherein said pulley includes a bearing to allow for ease of pulley rotation.

19. The outrigger halyard line positioning device according to claim 8 wherein said lever arm is pivotedly mounted to said housing by use of a driv-lok pin.

20. The outrigger halyard line positioning device according to claim 8 wherein said housing is constructed from a single piece of material.

21. The outrigger halyard line positioning device according to claim 8 including a coupler for securing at least two housings together.

\* \* \* \* \*